United States Patent
Blasco et al.

(10) Patent No.: US 11,364,685 B2
(45) Date of Patent: Jun. 21, 2022

(54) PREDICTING QUALITY OF A 3D OBJECT PART

(71) Applicant: Hewlett-Packard Development Company, L.P., Houston, TX (US)

(72) Inventors: Carmen Blasco, Sant Cugat del Valles (ES); Sergio Puigardeu Aramendia, Corvallis, OR (US); Alejandro Manuel De Pena, Sant Cugat del Valles (ES); Scott White, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 160 days.

(21) Appl. No.: 16/092,735

(22) PCT Filed: May 12, 2016

(86) PCT No.: PCT/US2016/032099
§ 371 (c)(1),
(2) Date: Oct. 10, 2018

(87) PCT Pub. No.: WO2017/196344
PCT Pub. Date: Nov. 16, 2017

(65) Prior Publication Data
US 2019/0160755 A1  May 30, 2019

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/165* (2017.08); *B33Y 10/00* (2014.12);
(Continued)

(58) Field of Classification Search
CPC ... B29C 64/393; B29C 64/165; B29C 64/153; B29C 67/00; B29C 64/209;
(Continued)

(56) References Cited

U.S. PATENT DOCUMENTS 6,015,241 A * 1/2000 Wiklof ................. B41J 13/0027
400/578
6,533,384 B1 * 3/2003 Vega .................... B41J 2/16579
347/19
(Continued)

FOREIGN PATENT DOCUMENTS

CN  101901283  12/2010
CN  102649159  8/2012
(Continued)

OTHER PUBLICATIONS

Ian Wing, Rob Gorham, & Brenna Sniderman, "3D Opportunity for Quality Assurance and Parts Qualification", Nov. 18, 2015, 43 pages. http://dupress.com/articles/3d-printing-quality-assurance-in-manufacturing/.
(Continued)

*Primary Examiner* — M. N. Von Buhr
(74) *Attorney, Agent, or Firm* — Mannava & Kang (57) ABSTRACT

According to an example, a computing apparatus may include a processing device and a machine readable storage medium on which is stored instructions that when executed by the processing device, cause the processing device to access, from a sensing device, information pertaining to formation of a part of a 3D object in a layer of build materials upon which fusing agent droplets have been or are to be selectively deposited. The instructions may also cause the processing device to predict, based upon the accessed information, a quality of the part and output an indication of the predicted quality of the part.

11 Claims, 5 Drawing Sheets

(51) Int. Cl.
  *G05B 19/418* (2006.01)
  *B33Y 10/00* (2015.01)
  *B33Y 40/00* (2020.01)
  *B33Y 30/00* (2015.01)
  *B29C 64/165* (2017.01)
  *B29C 64/153* (2017.01)

(52) U.S. Cl.
  CPC ............ *B33Y 30/00* (2014.12); *B33Y 40/00* (2014.12); *B33Y 50/02* (2014.12); *G05B 19/41875* (2013.01); *B29C 64/153* (2017.08); *G05B 2219/32194* (2013.01)

(58) Field of Classification Search
  CPC ... B29C 64/255; B29C 64/264; B29C 64/295; B29C 64/336; G05B 19/41875; G05B 2219/32194; B33Y 30/00; B33Y 10/00; B33Y 50/02; B33Y 50/00; B33Y 40/00
  See application file for complete search history.

(56) References Cited

U.S. PATENT DOCUMENTS

| | | | |
|---|---|---|---|
| 6,847,465 B1* | 1/2005 | Wetchler | B41J 2/16579 358/1.1 |
| 9,292,234 B2* | 3/2016 | Ward | G06F 3/121 |
| 10,625,469 B2* | 4/2020 | De Pena | G05B 19/4099 700/98 |
| 10,751,946 B2* | 8/2020 | Sanz Ananos | B29C 64/393 |
| 2004/0200816 A1* | 10/2004 | Chung | B29C 64/153 219/121.83 |
| 2006/0206227 A1 | 9/2006 | Kritchman et al. | |
| 2008/0262659 A1* | 10/2008 | Huskamp | G05D 23/27 700/300 |
| 2011/0241240 A1 | 10/2011 | Gothait et al. | |
| 2013/0015596 A1 | 1/2013 | Mozeika et al. | |
| 2013/0089642 A1 | 4/2013 | Lipson et al. | |
| 2013/0168902 A1* | 7/2013 | Herzog | B23K 26/705 264/401 |
| 2013/0328227 A1* | 12/2013 | McKinnon | B29C 64/393 264/40.1 |
| 2015/0097883 A1* | 4/2015 | Tamai | B41J 2/16538 347/9 |
| 2015/0106753 A1* | 4/2015 | Tran | G05B 23/0272 715/765 |
| 2015/0112644 A1 | 4/2015 | Schmidt | |
| 2015/0142159 A1 | 5/2015 | Chang | |
| 2015/0266242 A1 | 9/2015 | Comb et al. | |
| 2015/0273767 A1* | 10/2015 | Batchelder | B29C 64/135 264/401 |
| 2015/0307385 A1* | 10/2015 | Klein | B33Y 10/00 65/29.11 |
| 2015/0328839 A1* | 11/2015 | Willis | G05B 19/4099 700/98 |
| 2015/0352794 A1 | 12/2015 | Nguyen et al. | |
| 2015/0367453 A1* | 12/2015 | Herzog | B23K 26/342 419/26 |
| 2016/0018320 A1* | 1/2016 | Hess | B33Y 50/02 702/81 |
| 2016/0023403 A1* | 1/2016 | Ramos | B33Y 50/02 264/40.1 |
| 2016/0121599 A1* | 5/2016 | Bauer | B41F 21/104 118/704 |
| 2016/0184893 A1* | 6/2016 | Dave | B29C 64/153 419/53 |
| 2016/0185048 A1* | 6/2016 | Dave | B29C 64/386 700/119 |
| 2016/0224017 A1* | 8/2016 | Huang | B33Y 10/00 65/29.11 |
| 2016/0236414 A1* | 8/2016 | Reese | B33Y 50/02 |
| 2016/0349215 A1* | 12/2016 | Todorov | G01N 27/9013 |
| 2017/0190104 A1* | 7/2017 | Bostick | G05D 1/104 |
| 2017/0203515 A1* | 7/2017 | Bennett | B29C 64/232 |
| 2017/0246809 A1* | 8/2017 | Starr | B29C 64/135 264/401 |
| 2017/0246810 A1* | 8/2017 | Gold | B33Y 50/02 |
| 2018/0001565 A1* | 1/2018 | Hocker | G01N 23/223 |
| 2018/0087134 A1* | 3/2018 | Chang | C22C 26/00 |
| 2018/0143147 A1* | 5/2018 | Milner | B22F 3/105 |
| 2019/0039296 A1* | 2/2019 | Prasad | C09D 11/328 |
| 2019/0095555 A1* | 3/2019 | Lopez | G06F 30/17 |
| 2019/0111626 A1* | 4/2019 | Hierro Domenech | B33Y 10/00 |
| 2019/0125681 A1* | 5/2019 | Albed Alhnan | B29C 64/209 |
| 2019/0147585 A1* | 5/2019 | Hartman | B33Y 40/00 382/141 |

FOREIGN PATENT DOCUMENTS

| | | |
|---|---|---|
| CN | 102962452 | 3/2013 |
| DE | 102015011013 | 2/2016 |
| EP | 2918395 | 9/2015 |
| WO | WO-2014118635 | 8/2014 |
| WO | WO-2015057886 | 4/2015 |
| WO | WO-2015108546 A2 | 7/2015 |
| WO | WO-2016032075 | 3/2016 |
| WO | WO-2016042810 | 3/2016 |

OTHER PUBLICATIONS

International Search Report and Written Opinion dated Feb. 10, 2017, PCT Patent Application No. PCT/US2016/032099, filed May 12, 2016, Korean Intellectual Property Office, 12 pages.

* cited by examiner

```
ACCESS INFORMATION PERTAINING TO FORMATION OF A
PART OF A 3D OBJECT IN A LAYER OF BUILD MATERIALS
302
            ↓
PREDICT, BASED UPON THE ACCESSED INFORMATION, A
QUALITY OF THE PART
304
            ↓
OUTPUT AN INDICATION OF THE PREDICTED QUALITY OF
THE PART
306
```

```
ACCESS INFORMATION PERTAINING TO FORMATION OF A
PART OF A 3D OBJECT IN A LAYER OF BUILD MATERIALS
402
            ↓
PREDICT, BASED UPON THE ACCESSED INFORMATION, A
QUALITY OF THE PART
404
            ↓
DETERMINE THAT AN ISSUE EXISTS WITH THE PART
BASED UPON THE PREDICTED QUALITY
406
            ↓
IMPLEMENT A SOLUTION AND/OR OUTPUT AN
INDICATION OF THE PREDICTED QUALITY
408
```

PREDICTING QUALITY OF A 3D OBJECT PART

CLAIM FOR PRIORITY

The present application is a national stage filing under 35 U.S.C. § 371 of PCT application number PCT/US2016/032099, having an international filing date of May 12, 2016, the disclosure of which is hereby incorporated by reference in its entirety.

BACKGROUND

In three-dimensional (3D) printing, an additive printing process may be used to make three-dimensional solid parts from a digital model. 3D printing may be used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a computing apparatus, methods for implementing the computing apparatus, and a machine or computer readable medium on which is stored machine readable instructions for implementing the computing apparatus. Particularly, for instance, the computing apparatus disclosed herein may include a processing device that may access, from a sensing device, information pertaining to formation of a part of a 3D object in a layer of build materials upon which fusing agent droplets have been or are to be selectively deposited. The processing device may predict, based upon the accessed information, a quality of the part and may output an indication of the predicted quality of the part. In one regard, a user may be notified of the predicted quality of the part and may decide whether to proceed with printing of the 3D object. For instance, a user may decide to abort printing of the 3D object in response to being notified of the print quality of the part.

In another example, the processing device may determine whether an issue exists with the part being formed based upon the predicted quality of the part. As discussed in greater detail herein below, the processing device may determine that an issue exists with the part in instances in which the predicted quality of the part fails to meet or falls below a predefined threshold. In addition, the processing device may determine whether a solution to the determined issue is available and may implement the solution. Implementation of the solution may include, for instance, controlling a component of a 3D printer to modify application of a fusing agent, modify application of fusing radiation, modify application of warming heat, or the like.

Through implementation of the computing apparatus and methods disclosed herein, the quality of a 3D object part being formed in a layer of build materials may be predicted based upon conditions detected by a sensing device. In addition, the quality of the part may be improved through modifying an operation performed by the 3D printer. The processing device may modify the operation of the 3D printer automatically, i.e., without user intervention. However, a user may be notified of the predicted quality and may also be alerted to issues having relatively large severities such that the user may intervene in the printing process if necessary or desired.

Figure 1:
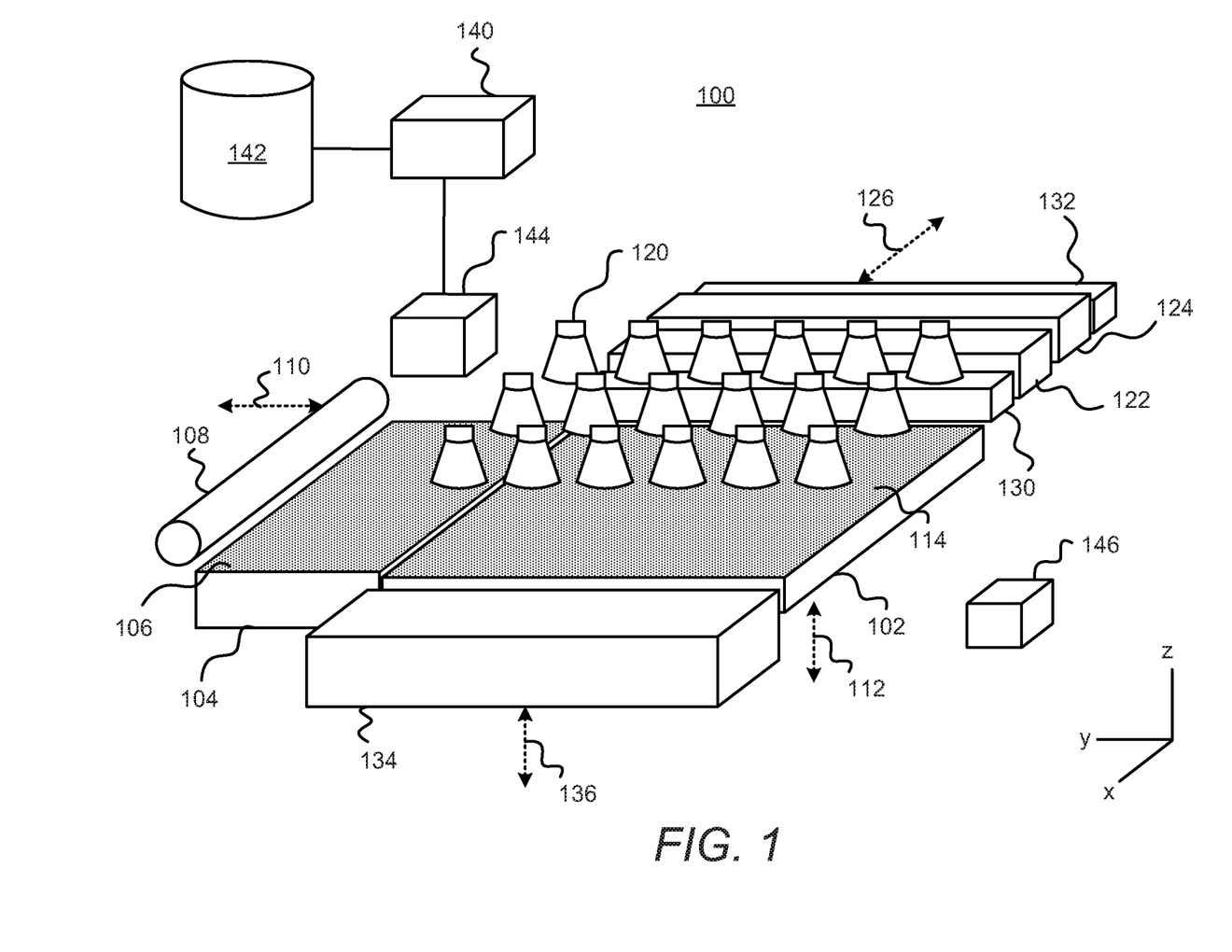
FIG. 1 shows a simplified isometric view of an example three-dimensional (3D) printer for generating, building, or printing three-dimensional parts.

With reference first to FIG. 1, there is shown a simplified isometric view of an example three-dimensional (3D) printer 100 for generating, building, or printing three-dimensional parts. It should be understood that the 3D printer 100 depicted in FIG. 1 may include additional components and that some of the components described herein may be removed and/or modified without departing from a scope of the 3D printer 100 disclosed herein.

The 3D printer 100 is depicted as including a build area platform 102, a build material supply 104 containing build materials 106, and a recoater 108. The build material supply 104 may be a container or surface that is to position build materials 106 between the recoater 108 and the build area platform 102. The build material supply 104 may be a hopper or a surface upon which the build materials 106 may be supplied, for instance, from a build material source (not shown) located above the build material supply 104. Additionally, or alternatively, the build material supply 104 may include a mechanism to provide, e.g., move, the build materials 106 from a storage location to a position to be spread onto the build area platform 102 or a previously formed layer of build materials 106. For instance, the build material supply 104 may include a hopper, an auger conveyer, or the like. Generally speaking, 3D objects or parts are to be generated from the build materials 106 and the build materials 106 may be formed of any suitable material including, but not limited to, polymers, metals, and ceramics. In addition, the build materials 106 may be in the form of a powder.

The recoater 108 may move in a direction as denoted by the arrow 110, e.g., along the y-axis, over the build material supply 104 and across the build area platform 102 to spread the build materials 106 into a layer 114 over a surface of the build area platform 102. The layer 114 may be formed to a substantially uniform thickness across the build area platform 102. In an example, the thickness of the layer 114 may range from about 90 µm to about 110 µm, although thinner or thicker layers may also be used. For example, the thickness of the layer 114 may range from about 20 µm to about 200 µm, or from about 50 µm to about 200 µm. The recoater 108 may also be returned to a position adjacent the build material supply 104 following the spreading of the build materials 106. In addition, or alternatively, a second build material supply (not shown) may be provided on an opposite side of the build area platform 102 and the recoater 108 may be positioned over the second build material supply after forming the layer of build materials 106. The recoater 108 may be a doctor blade, roller, a counter rotating roller or any other device suitable for spreading the build materials 106 over the build area platform 102.

The 3D printer 100 is also depicted as including a plurality of warming devices 120 arranged in an array above the build area platform 102. Each of the warming devices 120 may be a lamp or other heat source that is to apply heat onto spread layers of the build materials 106, for instance, to maintain the build materials 106 within a predetermined temperature range. The warming devices 120 may maintain the temperatures of the build materials 106 at a relatively high temperature that facilitates the selective fusing of the build materials 106. That is, the warming devices 120 may maintain the build materials 106 at a sufficiently high temperature that enables the build materials 106 upon which fusing agent droplets are provided to fuse together upon receipt of fusing radiation without causing the build materials 106 to otherwise fuse together. The warming devices 120 may be activated in a non-continuous manner such that the build materials 106 may be kept within a predetermined temperature range as various processes, including application of fusing radiation, are performed on the build materials 106.

The 3D printer 100 is further depicted as including a first delivery device 122 and a second delivery device 124, which may both be scanned across the layer 114 on the build area platform 102 in both of the directions indicated by the arrow 126, e.g., along the x-axis. For instance, the first delivery device 122 may deposit first liquid droplets as the first delivery device 122 is scanned in a first x direction 126 and the second delivery device 124 may deposit second liquid droplets as the second delivery device 124 is scanned in an opposite x direction 126. The first delivery device 122 and the second delivery device 124 may be thermal inkjet printheads, piezoelectric printheads, or the like, and may extend a width of the build area platform 102. The first delivery device 122 and the second delivery device 124 may each include a printhead or multiple printheads available from the Hewlett Packard Company of Palo Alto, Calif. Although the first delivery device 122 and the second delivery device 124 have each been depicted in FIG. 1 as being formed of separate devices, it should be understood that each of the first delivery device 122 and the second delivery device 124 may be included on the same printhead. For instance, the first delivery device 122 may include a first set of actuators and nozzles in a printhead and the second delivery device 124 may include a second set of actuators and nozzles in the printhead.

In other examples in which the first delivery device 122 and the second delivery device 124 do not extend the width of the build area platform 102, the first delivery device 122 and the second delivery device 124 may also be scanned along the y-axis to thus enable the first delivery device 122 and the second delivery device 124 to be positioned over a majority of the area above the build area platform 102. The first delivery device 122 and the second delivery device 124 may thus be attached to a moving XY stage or a translational carriage (neither of which is shown) that is to move the first delivery device 122 and the second delivery device 124 adjacent to the build area platform 102 in order to deposit respective liquids in predetermined areas of the layer 114 of the build materials 106.

Although not shown, the first delivery device 122 and the second delivery device 124 may each include a plurality of nozzles through which the respective liquid droplets are to be ejected onto the layer 114. The first delivery device 122 may deposit a first liquid and the second delivery device 124 may deposit a second liquid. The first liquid and the second liquid may both be fusing agents, may both be detailing agents, or one may be a fusing agent and the other may be detailing agent. A fusing agent may be a liquid that is to absorb fusing radiation (e.g., in the form of light and/or heat) to cause the build materials 106 upon which the fusing agent has been deposited to fuse together when the fusing radiation is applied. A detailing agent may be a liquid that may absorb significantly less of the fusing radiation as compared with the fusing agent. In one example, the detailing agent may prevent or significantly reduce the fusing together of the build materials 106 upon which the detailing agent has been deposited. In other examples, the detailing agent may be implemented to provide coloring to exterior portions of the build materials 106 that have been fused together.

The first liquid and the second liquid may also include various additives and/or catalysts that either enhance or reduce radiation absorption. For instance, the first liquid may include a radiation absorbing agent, i.e., an active material, metal nanoparticles, or the like. The first liquid and the second liquid may also include any of a co-solvent, a surfactant, a biocide, an anti-kogation agent, a dispersant, and/or combinations thereof.

Although not shown, the 3D printer 100 may include additional delivery devices, e.g., printheads, that may deposit multiple liquids having different radiation absorption properties with respect to each other. By way of example, the multiple liquids may have different colors with respect to each other, may have different chemical compositions (e.g., different reactants and/or catalysts) with respect to each other, or the like. In the example in which the 3D printer 100 may deposit multiple liquids, the 3D printer 100 may include multiple printheads, in which each of the multiple printheads may deposit a liquid having a different radiation absorption property with respect to the other liquids.

Following deposition of the first liquid droplets and/or the second liquid droplets onto selected areas of the layer 114 of the build materials 106, a first radiation generator 130 and/or a second radiation generator 132 may be implemented to apply fusing radiation onto the build materials 106 in the layer 114. Particularly, the radiation generator(s) 130, 132 may be activated and moved across the layer 114, for instance, along the directions indicated by the arrow 126 to apply fusing radiation in the form of light and/or heat onto the build materials 106. Examples of the radiation generators 130, 132 may include UV, IR or near-IR curing lamps, IR or near-IR light emitting diodes (LED), halogen lamps emitting in the visible and near-IR range, or lasers with desirable electromagnetic wavelengths. The types of radiation generators 130, 132 may depend, at least in part, on the type of active material used in the liquid(s). According to an example, the first delivery device 122, the second delivery device 124, the first fusing radiation generator 130, and the second fusing radiation generator 132 may be supported on a carriage (not shown) that may be scanned over the build area platform 102 in the directions denoted by the arrow 126.

Following application of liquid droplets during the multiple passes and following application of the radiation to fuse selected sections of the build materials 106 together, the build area platform 102 may be lowered as denoted by the arrow 112, e.g., along the z-axis. In addition, the recoater 108 may be moved across the build area platform 102 to form a new layer of build materials 106 on top of the previously formed layer 114. Moreover, the first delivery device 122 may deposit first liquid droplets and the second delivery device 124 may deposit second liquid droplets onto respective selected areas of the new layer of build materials 106 in single and/or multiple passes as discussed above. The above-described process may be repeated until parts of the 3D object have been formed in a predetermined number of layers to fabricate a green body of the 3D object.

Additionally, following a liquid deposition operation across a build material layer or following multiple liquid deposition operations across multiple build material layers, the first delivery device 122 and the second delivery device 124 may be positioned adjacent to a wiping mechanism 134. The wiping mechanism 134 may wipe the nozzles of the first delivery device 122 and the second delivery device 124, as well as the nozzles of additional delivery devices if included in the 3D printer 100. The wiping mechanism 134 may be moved to a position in which a surface, such as a cleaning web (not shown), of the wiping mechanism 134 is in contact with the exterior surfaces of the nozzles. The wiping mechanism 134 may be moved in the z-direction as noted by the arrow 136 to remove debris such as, build materials 106, liquid, dust, etc., that may be in contact with the exterior surfaces of the first delivery device 122 and the second delivery device 124, to maintain the delivery devices 122, 124 at or above desired performance levels.

As further shown in FIG. 1, the 3D printer 100 may include a processing device 140 that may control operations of the build area platform 102, the build material supply 104, the recoater 108, the warming devices 120, the first delivery device 122, the second delivery device 124, the radiation generators 130, 132, and the wiping mechanism 134. Particularly, for instance, the processing device 140 may control actuators (not shown) to control various operations of the 3D printer 100 components. The processing device 140 may be a computing device, a semiconductor-based microprocessing device, a central processing unit (CPU), an application specific integrated circuit (ASIC), and/or other hardware device. Although not shown, the processing device 140 may be connected to the 3D printer 100 components via communication lines.

The processing device 140 is also depicted as being in communication with a data store 142. The data store 142 may include data pertaining to a 3D object to be printed by the 3D printer 100. For instance, the data may include the locations in each build material layer that the first delivery device 122 is to deposit a first liquid and that the second delivery device 124 is to deposit a second liquid to form the green body of the 3D object. In one example, the processing device 140 may use the data to control the locations on each of the build material layers that the first delivery device 122 and the second delivery device 124 respectively deposit droplets of the first and second liquids.

The 3D printer 100 may also include sensing devices 144, 146 that may detect and/or measure attributes pertaining to the formation of a part of a 3D object in the layer 114 of build materials 106. The part may be a portion of the 3D object that is formed through selective fusing of a plurality of the build materials 106 in the layer 114. In any regard, the attributes that the sensing devices 144, 146 may detect may include, for instance, temperatures across the layer 114, an advancement of the build material platform 102, temperatures of the build materials 106 stored in the build material supply 104, etc. By way of example, a first sensing device 144 may be a thermal sensing device, e.g., an infrared sensing device, that may detect temperatures across the layer 114 at least one of prior to, during, and after selective application of fusing agent droplets onto the build materials 106 forming the layer 114. In addition, the second sensing device 146 may be a positional sensing device, e.g., an encoder, that may detect and track movement of the build area platform 102. The sensing devices 144, 146 may communicate the detected conditions to the processing device 140. As discussed in greater detail herein below, the processing device 140 may predict a quality of the part being formed in the layer 114 based upon the detected conditions. The processing device 140 may also determine, from the predicted quality, whether an issue exists with the part based upon the predicted quality and may take corrective measures, if available, and may output an indication of the predicted quality.

Figure 2A:
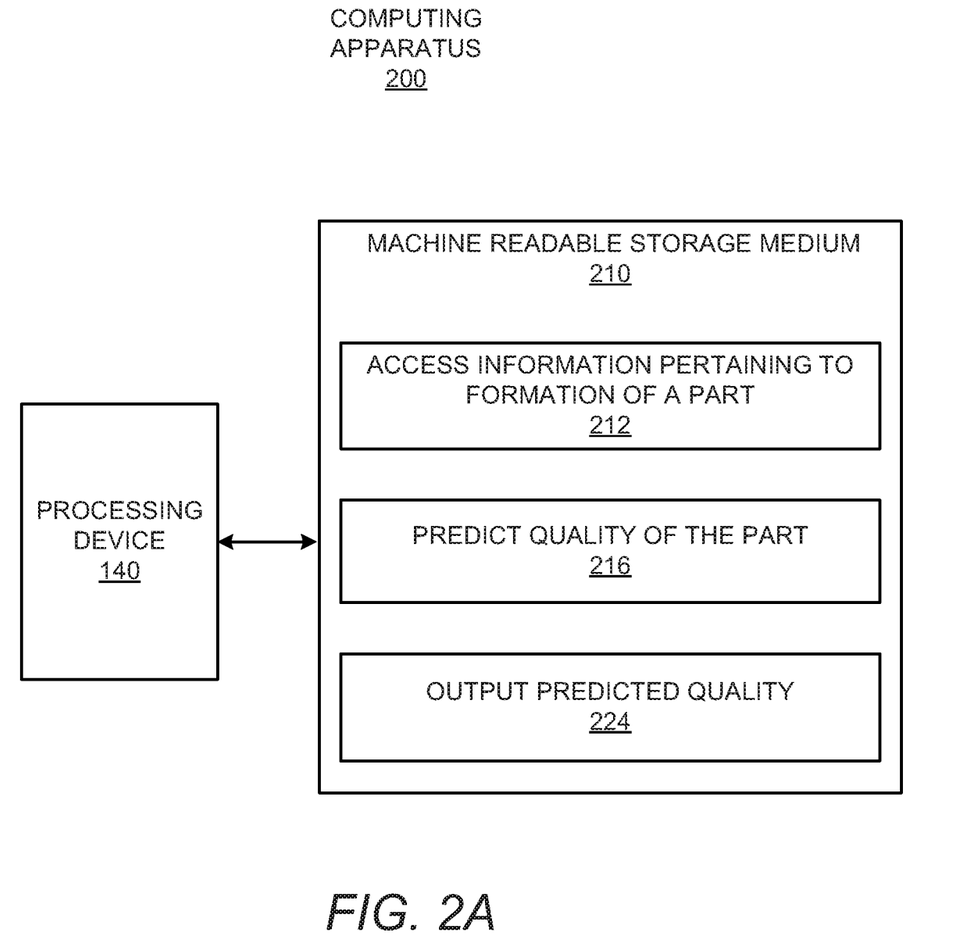
FIGS. 2A and 2B, respectively, show simplified block diagrams of example computing apparatuses.
Figure 2B:
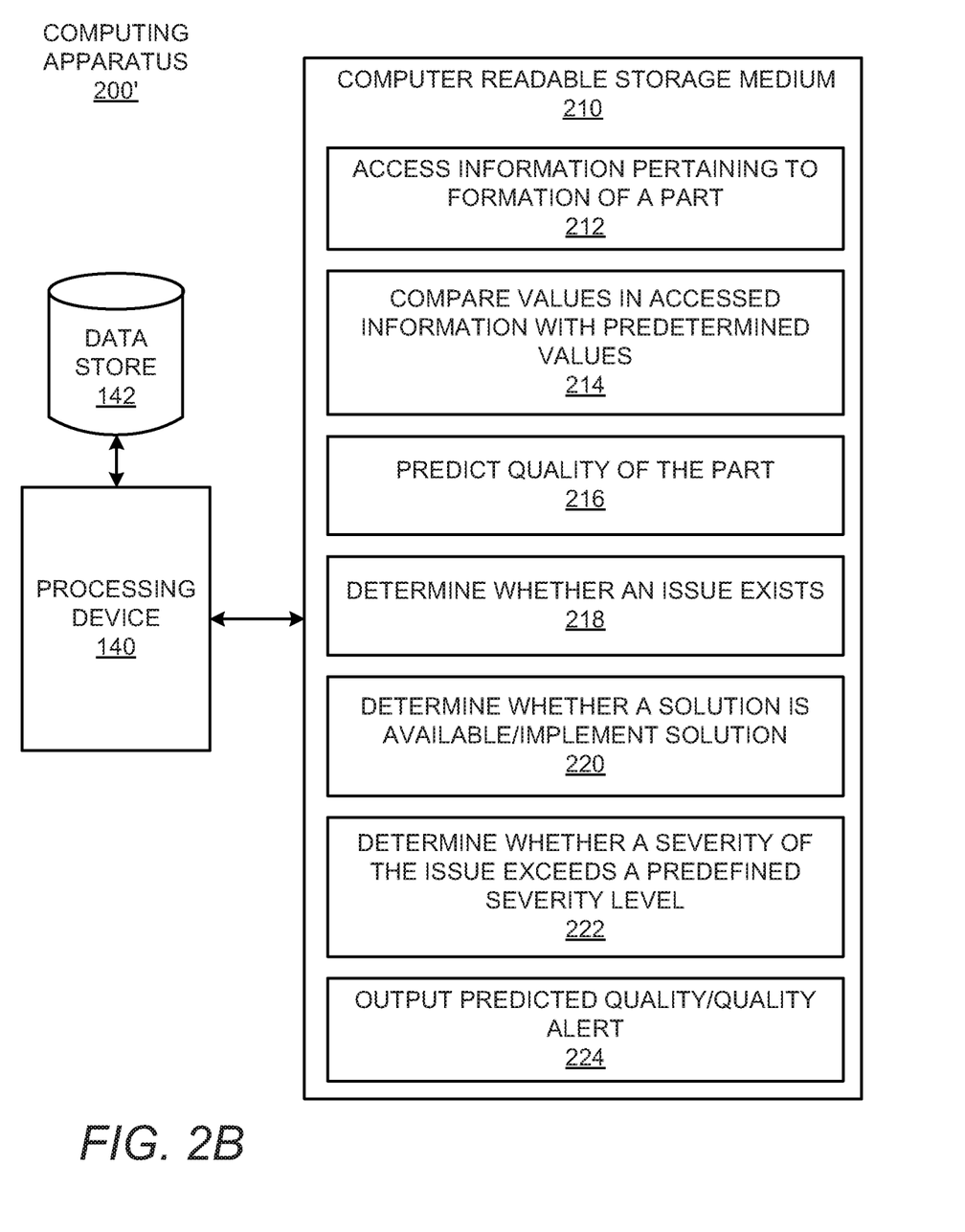

Turning now to FIGS. 2A and 2B, there respectively shown simplified block diagrams of example computing apparatuses 200, 200'. According to an example, either of the computing apparatuses 200, 200' may be implemented as part of the 3D printer 100. For instance, either of the computing apparatuses 200, 200' may be a command module or other control system of the 3D printer 100. In another example, either of the computing apparatuses 200, 200' may be separate from the 3D printer 100 and may be, for instance, a personal computer, a laptop computer, a server computer, or the like. It should be understood that the computing apparatuses 200, 200' depicted in FIGS. 2A and 2B may include additional components and that some of the components described herein may be removed and/or modified without departing from scopes of the computing apparatuses 200, 200' disclosed herein.

With reference first to FIG. 2A, the computing apparatus 200 is shown as including a processing device 140, which may be the same as the processing device 140 depicted in and described above with respect to FIG. 1. As such, the processing device 140 depicted in FIG. 2A is not described in detail and instead, the description of the processing device 140 provided above with respect to the 3D printer 100 is intended to also describe this component with respect to the computing apparatus 200.

The computing apparatus 200 may also include a machine readable storage medium 210 on which is stored machine readable instructions 212, 216, and 224 that the processing device 140 may execute. More particularly, the processing device 140 may fetch, decode, and execute the instructions 212, 216, and 224 to access information pertaining to a part of a 3D object in a layer 114 of build materials 106 upon which fusing agent droplets have been or are to be selectively deposited 212, to predict a quality of the part 216, and to output the predicted quality 224. As an alternative or in addition to retrieving and executing instructions, the processing device 140 may include one or more electronic circuits that include components for performing the functionalities of the instructions 212, 216, and 224. In any regard, and as discussed above, the processing device 140 may communicate instruction signals to the various components of the 3D printer 100 via communication lines such that the components may operate in the manners described herein.

With reference now to FIG. 2B, the computing apparatus 200' is shown as including a processing device 140 and a data store 142, which may be the same as the processing device 140 and the data store 142 depicted in and described above with respect to FIG. 1. As such, the processing device 140 and the data store 142 depicted in FIG. 2B are not described in detail and instead, the descriptions of the processing device 140 and the data store 142 provided above with respect to the 3D printer 100 are intended to also describe these components with respect to the computing apparatus 200'.

The computing apparatus 200' may also include a machine readable storage medium 210 on which is stored machine readable instructions 212-224 that the processing device 140 may execute. More particularly, the processing device 140 may fetch, decode, and execute the instructions 212-224 to access information pertaining to a part of a 3D object in a layer 114 of build materials 106 upon which fusing agent droplets have been or are to be selectively deposited 212, to compare values in the accessed information with predetermined values 214, to predict a quality of the part 216, to determine whether an issue with the part exists 218, to determine whether a solution to a determined issue is available/implement a solution 220, to determine whether a severity of the determined issue exceeds a predefined severity level 222, and to output the predicted quality and/or a quality alert 224. As an alternative or in addition to retrieving and executing instructions, the processing device 140 may include one or more electronic circuits that include components for performing the functionalities of the instructions 212-228. In any regard, and as discussed above, the processing device 140 may communicate instruction signals to the various components of the 3D printer 100 via communication lines such that the components may operate in the manners described herein.

The machine readable storage medium 210 depicted in FIGS. 2A and 2B may be any electronic, magnetic, optical, or other physical storage device that contains or stores executable instructions. Thus, the machine readable storage medium 210 may be, for example, Random Access Memory (RAM), an Electrically Erasable Programmable Read-Only Memory (EEPROM), a storage device, an optical disc, and the like. The machine readable storage medium 210 may be a non-transitory machine-readable storage medium, where the term "non-transitory" does not encompass transitory propagating signals.

Figure 3:
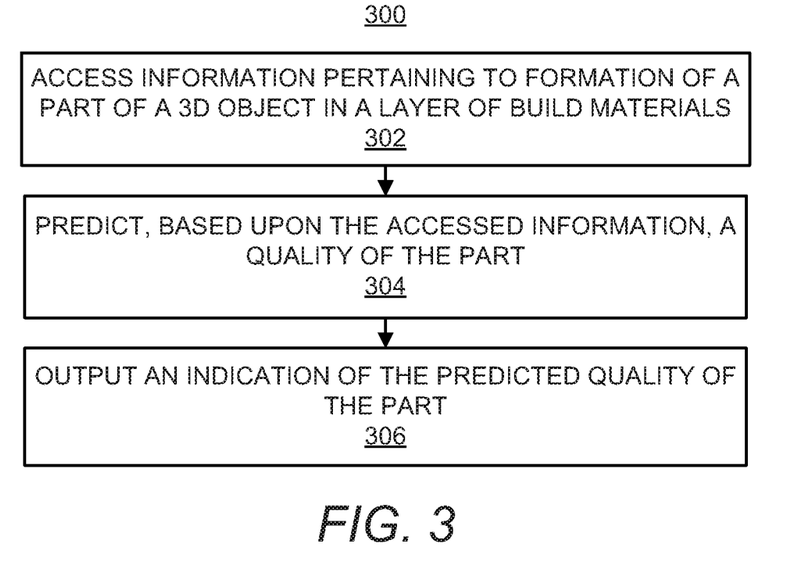
FIGS. 3-5, respectively, depict example methods for predicting a quality of a part formed of build materials in a layer of the build materials.
Figure 4:
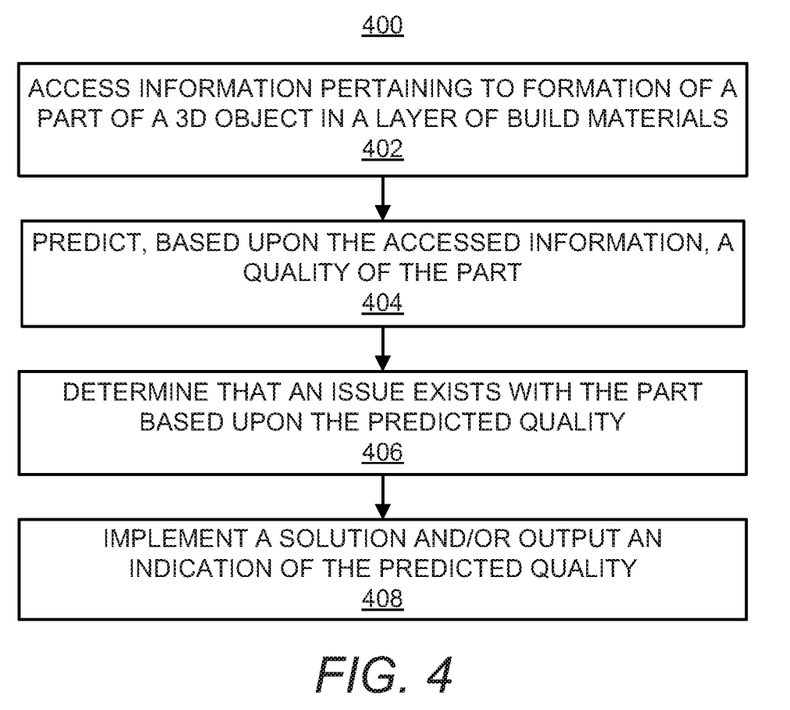
Figure 5:
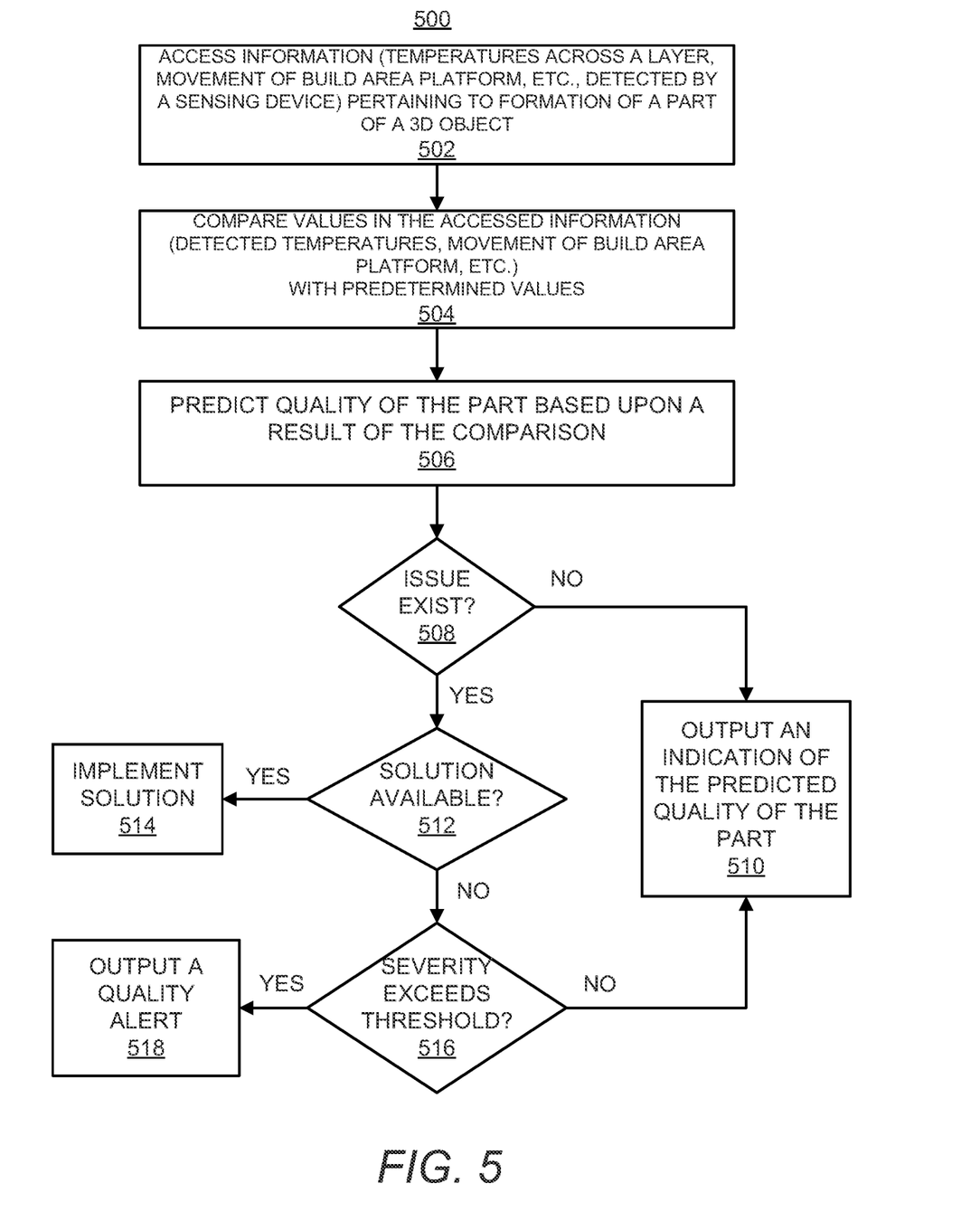

Various manners in which the computing apparatuses 200, 200' may be implemented are discussed in greater detail with respect to the methods 300, 400, and 500 respectively depicted in FIGS. 3-5. Particularly, FIGS. 3-5, respectively, depict example methods 300, 400, and 500 for predicting a quality of a part formed of build materials 106 in a layer 114 of the build materials 106. It should be apparent to those of ordinary skill in the art that the methods 300, 400, and 500 may represent generalized illustrations and that other operations may be added or existing operations may be removed, modified, or rearranged without departing from the scopes of the methods 300, 400, and 500.

The descriptions of the methods 300, 400, and 500 are made with reference to the 3D printer 100 illustrated in FIG. 1 and the computing apparatuses 200, 200' illustrated in FIGS. 2A and 2B for purposes of illustration. It should, however, be understood that 3D printers and computing apparatuses having other configurations may be implemented to perform any of the methods 300, 400, and 500 without departing from the scopes of the methods 300, 400, and 500.

With reference first to FIG. 3, at block 302, information pertaining to formation of a part of a 3D object in a layer 114 of build materials 106 upon which fusing agent droplets have been or are to be selectively deposited may be accessed from a sensing device 144, 146. For instance, the processing device 140 may execute the instructions 212 to access information, such as conditions detected by the sensing devices 144, 146. The processing device 140 may access this information directly from the sensing devices 144, 146 and/or from a data storage location, such as the data store 142, and in instances in which the sensing devices 144, 146 store detected condition information in the data storage location.

At block 304, a quality of the part may be predicted based upon the accessed information. For instance, the processing device 140 may execute the instructions 216 to predict the quality of the part based upon the detected conditions as the part is being formed. For instance, the processing device 140 may predict that the quality of the part is relatively low in response to the temperatures of the build materials 106 forming the part being below a threshold temperature. By way of particular example, the threshold temperature may be a temperature at which the build materials 106 become fused together. In this example, the processing device 140 may predict that the mechanical properties of the part are below a threshold because the build materials 106 may not have sufficiently been fused together.

The processing device 140 may additionally and/or alternatively predict other types of factors in predicting the quality of the part. For instance, the processing device 140 may predict that the part may have a particular roughness, a particular dimensional accuracy, a particular color, or the like, based upon the accessed information. According to an example, the processing device 140 may access data pertaining to correlations between different predicted properties of the part and different conditions that may be detected during formation of the part. In this example, the data may be generated through testing various conditions resulting properties.

At block 306, an indication of the predicted quality of the part may be outputted. The processing device 140 may execute the instructions 224 to output the predicted quality. For instance, the processing device 140 may output the predicted quality by storing the predicted quality in the data store 142, by communicating the predicted quality to a user's computing device, by displaying the predicted quality on a display monitor, or the like. The processing device 140 may also output detected values of the accessed information used in determining the quality of the part, e.g., the predicted mechanical strength, the predicted color, etc.

With reference now to FIG. 4, at blocks 402 and 404, information pertaining to formation of a part may be accessed from a sensing device 144, 146 and based upon the accessed information, a quality of the part may be predicted. Blocks 402 and 404 may be equivalent to blocks 302 and 304 described above with respect to the method 300 in FIG. 3.

At block 406, a determination may be made that an issue exists with the part based upon the predicted quality of the part. The processing device 140 may execute the instructions 218 to determine whether an issue with the part exists based upon the predicted quality of the part. The processing device 140 may determine that an issue exists with the part if the predicted quality of the part falls below a predetermined quality threshold level. By way of example in which the predicted quality of the part is mechanical strength, the processing device 140 may determine that an issue exists with the part if the mechanical strength of the part is predicted to fall below a predetermined threshold level, e.g., that the part is unable to withstand about 30 megapascals of pressure. In another example in which the predicted quality of the part is color, the processing device 140 may determine that an issue exists with the part if the color of the part is predicted to differ by a predetermined threshold amount from a desired color, in which the predetermined threshold amount may be user defined.

At block 408, a solution to the issue may be implemented and/or an indication of the predicted quality of the part may be outputted in response to the determination that an issue exists with the part. The processing device 140 may execute the instructions 220 to implement a solution to the determined issue and/or may execute the instructions 224 to output the predicted quality of the part. For instance, the processing device 140 may implement the solution when the solution is available and may output the predicted quality of the part when a solution is not available. In another example, the processing device 140 may both output the predicted quality of the part and may implement the solution. In any regard, the processing device 140 may output the predicted quality of the part in any of the manners discussed above with respect to block 306 in FIG. 3.

According to an example, the processing device 140 may determine a particular solution to the determined issue based upon the type of issue that has been determined. For instance, in an example in which the color of the part is predicted to fail to meet a desired color, the processing device 140 may determine that the solution is to add additional liquid droplets of the correct color onto the build materials 106 forming the part. In this example, the processing device 140 may implement the solution at block 408 by controlling a delivery device 122 to deposit the additional liquid droplets of the correct color onto the build materials 106. In another example in which the mechanical strength of the part is predicted to fail to meet a predetermined threshold, the processing device 140 may determine that the solution is to apply additional fusing radiation onto the build materials 106 forming the part. In this example, the processing device 140 may implement the solution at block 408 by controlling a fusing radiation generator 130 to apply additional fusing radiation onto the build materials 106 forming the part.

With reference now to FIG. 5, at block 502, information pertaining to formation of a part of a 3D object to be formed in a layer of build materials may be accessed from a sensing device 144, 146. Block 502 may be equivalent to block 302 described above with respect to the method 300 in FIG. 3.

At block 504, values in the accessed information may be compared with corresponding predetermined values. The processing device 140 may compare the values in the accessed information with corresponding predetermined values. For instance, the processing device 140 may compare the temperatures detected across the layer 114 with predetermined temperature values. As another example, the processing device 140 may compare the detected movement distance of the build area platform 102 with a predefined movement distance. As a yet further example, the processing device 140 may compare the detected color of the build materials 106 forming the part following application of liquid droplets onto the build materials 106 with a predefined color.

At block 506, a quality of the part may be predicted based upon a result of the comparison performed at block 504. The processing device 140 may execute the instructions 216 to predict or otherwise determine the quality of the part based upon, for instance, how the values in the accessed information relate with respect to corresponding predetermined values. For instance, the processing device 140 may determine that the part is of relatively high quality in response to the values in the accessed information being within a range of or matching the corresponding predetermined values. In another example, the processing device 140 may determine that the part is of relatively low quality in response to the values in the accessed information either falling below or exceeding a range of the corresponding predetermined values. The processing device 140 may determine, for instance, that certain attributes of the part are predicted to have a relatively high quality while also determining that other attributes of the part are predicted to have a relatively low quality based upon the comparison of the values.

At block 508, a determination may be made as to whether an issue exists with the part based upon the predicted quality of the part. The processing device 140 may execute the instructions 218 to determine whether the predicted quality of the part indicates that an issue, such as a potential problem, exists with the part. For instance, the processing device 140 may determine that the predicted quality of the part indicates that an issue exists because the predicted quality of the part falls below a predetermined threshold. By way of example, the processing device 140 may determine that an issue exists with the part in any of the manners discussed above with respect to block 406 in FIG. 4.

In response to a determination that an issue with the part does not exist, an indication of the predicted quality of the part may be outputted as indicated at block 510. For instance, the processing device 140 may execute the instructions 224 to output the predicted quality of the part in any of the manners discussed above with respect to block 306 in FIG. 3. However, in response to a determination that an issue with the part does exist, a determination may be made as to whether a solution to the issue is available, as indicated at block 512. The processing device 140 may execute the instructions 220 to determine whether a solution to the issue is available. For instance, the processing device 140 may determine that a solution to the issue is available if the issue matches or is equivalent to a previously identified issue for which a solution has been identified and has been stored in the data store 142.

In response to a determination that a solution to the issue is available, the solution may be implemented as indicated at block 514. For instance, the processing device 140 may execute the instructions 220 to control a component of the 3D printer 100 to resolve the issue. By way of example, in which the issue is that the build area platform 102 advanced farther than intended from a prior layer processing operation, the processing device 140 may control the warming devices 120 to increase energy output to compensate for the increased distance between the warming devices 120 and the layer 114. In this example, the processing device 140 may increase the pulse width modulation signals communicated to the warming devices 120 to cause the increase in the energy output from the warming devices 120.

According to another example, however, the processing device 140 may not always implement a solution when a solution is available. Instead, the processing device 140 may determine whether to implement a solution based upon a selected print mode of the 3D printer 100 in printing the part. The print mode may include, for instance, a draft quality print mode, a custom quality print mode, a high quality print mode, etc., in which the quality of the part (and the 3D object) may correspond to the selected print mode. In this example, the processing device 140 may implement the solution in response to the selected print mode being higher than the draft quality print mode. That is, for instance, a user may select to print the 3D object in a draft quality print mode in cases where the quality of the 3D object may not be of importance and thus, a lower quality part may be suitable.

With reference back to block 512, in response to a determination that a solution to the issue is not available, a determination may be made as to whether a severity of the issue exceeds a predefined severity level. The processing device 140 may execute the instructions 222 to determine the severity of the issue and may compare the determined severity of the issue to a predefined severity level. According to an example, the predefined severity level may be based upon the selected print mode at which the 3D object is to be printed. Thus, for instance, the predefined severity level may be relatively higher for lower quality print modes than for higher quality print modes. In addition, the predefined severity level may depend upon the type of issue determined and/or may be user-defined.

In response to a determination that the severity of the issue does not exceed the predefined severity level threshold, an indication of the predicted quality of the part may be outputted at block 510. However, in response to a determination that the severity of the issue does exceed the predefined severity level, a quality alert may be outputted at block 518. For instance, the processing device 140 may execute the instructions 224 to output either or both of the predicted quality and the quality alert. The processing device 140 may output either or both of the predicted quality and quality alert through a display monitor, an audible alarm, etc. A user may continue or may cancel printing of the part in response to being alerted to the predicted quality of the part.

Some or all of the operations set forth in the methods 300, 400, and 500 may be contained as utilities, programs, or subprograms, in any desired computer accessible medium. In addition, the methods 300, 400, and 500 may be embodied by computer programs, which may exist in a variety of forms both active and inactive. For example, they may exist as machine readable instructions, including source code, object code, executable code or other formats. Any of the above may be embodied on a non-transitory machine (or computer) readable storage medium. Examples of non-transitory machine readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A computing apparatus comprising:
   a thermal sensing device to detect temperatures across a layer of build materials on a build area platform;
   a processing device; and
   a machine readable storage medium storing instructions that when executed by the processing device, cause the processing device to:
   access information pertaining to formation of a part of a 3D object in the layer of build materials on the build area platform, wherein the accessed information includes the temperatures across the layer of build materials detected by the thermal sensing device;
   compare the temperatures detected by the thermal sensing device to a threshold temperature;
   predict that a quality of the part is relatively low in response to the detected temperatures being below the threshold temperature;
   determine whether an issue exists with respect to the part based upon the predicted quality of the part being relatively low;
   in response to a determination that an issue exists with respect to the part, identify a solution to the issue;
   identify a user-selected quality print mode for printing the part;
   determine whether the user-selected quality print mode exceeds a predefined quality level;
   in response to the user-selected quality print mode exceeding the predefined quality level, implement the solution to the issue; and
   in response to the user-selected quality print mode not exceeding the predefined quality level, generate an alert indication of the issue.

2. The computing apparatus according to claim 1, wherein the instructions are further executable to cause the processing device to:
   compare the detected temperatures with a predetermined range of temperatures, wherein the predetermined range of temperatures includes the threshold temperature; and
   predict the quality of the part based upon a result of the comparison.

3. The computing apparatus according to claim 1, wherein the instructions are further executable to cause the processing device to:
   in response to the determination that the issue exists, determine whether the solution to the issue is available, wherein the solution to the issue is dependent upon whether the detected temperatures exceed or fall below a predetermined threshold range.

4. The computing apparatus according to claim 1, wherein the instructions are further executable to cause the processing device to:
   in response to the determination that the issue exists, determine whether a severity of the issue exceeds a predefined severity level; and
   in response to a determination that the severity of the issue exceeds the predefined severity level, output the alert indication of the issue.

5. The computing apparatus according to claim 1, further comprising:
   a positional sensing device to detect an advancement of the build area platform,
   wherein the accessed information comprises the advancement of the build area platform detected by the positional sensing device, and wherein the instructions are further executable to cause the processing device to:
compare the detected advancement of the build area platform to a predetermined advancement distance; and
predict the quality of the part based further upon a result of the comparison of the detected advancement of the build area platform to the predetermined advancement distance.

6. The computing apparatus according to claim 1, wherein the predicted quality of the part includes at least one of mechanical properties, roughness, dimensional accuracy, and color of the part.

7. A method comprising:
detecting, by a thermal sensing device, temperatures across a layer of build materials on a build area platform;
accessing, by a processing device and from the thermal sensing device, information pertaining to formation of a part of a three-dimensional (3D) object on the build area platform, wherein the accessed information includes the temperatures across the layer of build materials detected by the thermal sensing device;
comparing, by the processor, the detected temperatures to a threshold temperature;
predicting, by the processing device, that a quality of the part is relatively low in response to the detected temperatures being below the threshold temperature;
determining, by the processing device, that an issue exists with the part based upon the predicted quality of the part being relatively low;
in response to the determination that the issue exists with the part, identify a solution to the issue;
identifying, by the processing device, a user-selected quality print mode for printing the part;
determining, by the processing device, whether the user-selected quality print mode exceeds a predefined quality level;
in response to the user-selected quality print mode exceeding the predefined quality level, implementing, by the processing device, the solution to the issue; and
in response to the user-selected quality print mode not exceeding the predefined quality level, generating, by the processing device, an alert indication of the issue.

8. The method according to claim 7, further comprising:
detecting, by a positional sensing device, an advancement of the build area platform, wherein the accessed information pertaining to the formation of the part further includes the advancement of the build area platform detected by the positional sensing device;
comparing the detected advancement of the build area platform to a predetermined advancement distance; and
predicting the quality of the part based further on a result of the comparison of the detected advancement of the build area platform to the predetermined advancement distance.

9. The method according to claim 7, further comprising:
implementing the solution by varying an application of warming energy onto the layer of build materials from a predefined application of the warming energy.

10. A non-transitory computer readable medium storing machine readable instructions that when executed by a processing device, cause the processing device to:
access, from a thermal sensing device, information pertaining to formation of a part of a three dimensional (3D) object in a layer of build materials on a build area platform, wherein the accessed information includes temperatures across the layer of build materials detected by the thermal sensing device;
compare the detected temperatures to a threshold temperature;
predict that a quality of the part is relatively low in response to the detected temperatures being below the threshold temperature;
determine that an issue exists with the part based upon the predicted quality of the part being relatively low;
in response to a determination that an issue exists with the part, identify a solution to the issue;
identify a user-selected quality print mode for printing the part;
determine whether the user-selected quality print mode exceeds a predefined quality level;
in response to the user-selected quality print mode exceeding the predefined quality level, implement the solution to the issue; and
in response to the user-selected quality print mode not exceeding the predefined quality level, generate an alert indication of the issue.

11. The non-transitory computer readable medium according to claim 10, wherein the accessed information pertaining to the formation of the part further includes an advancement of the build area platform detected by a positional sensing device, and wherein the instructions are further executable to cause the processing device to:
compare the advancement of the build area platform detected by the positional sensing device to a predetermined advancement distance; and
predict the quality of the part based further upon a result of the comparison of the detected advancement of the build area platform to the predetermined advancement distance.

* * * * *